June 5, 1934.

N. TROYER ET AL 1,961,994

OVAL CAN SEAMER

Filed May 7, 1931

INVENTORS
NELSON TROYER
PAUL E. PEARSON
BY
Cook & Robinson
ATTORNEYS

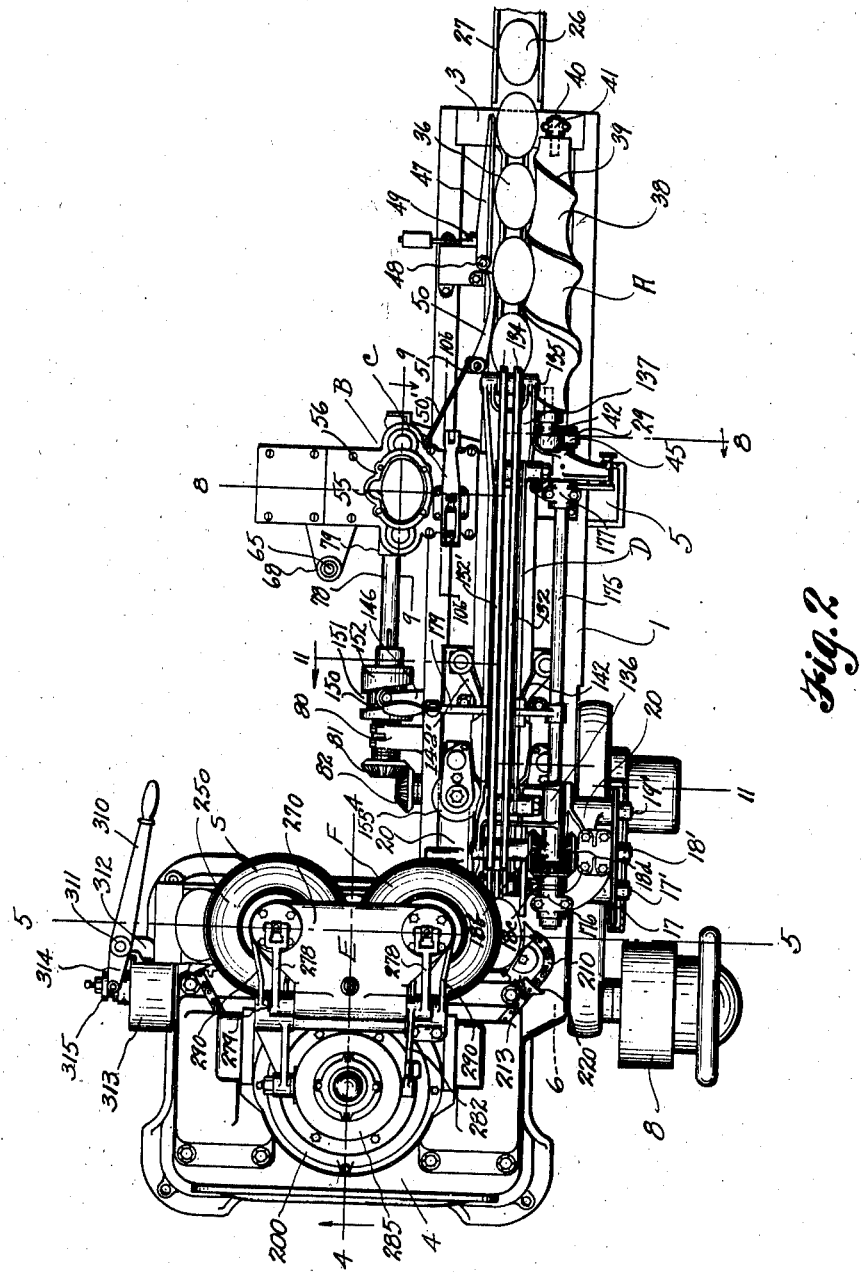

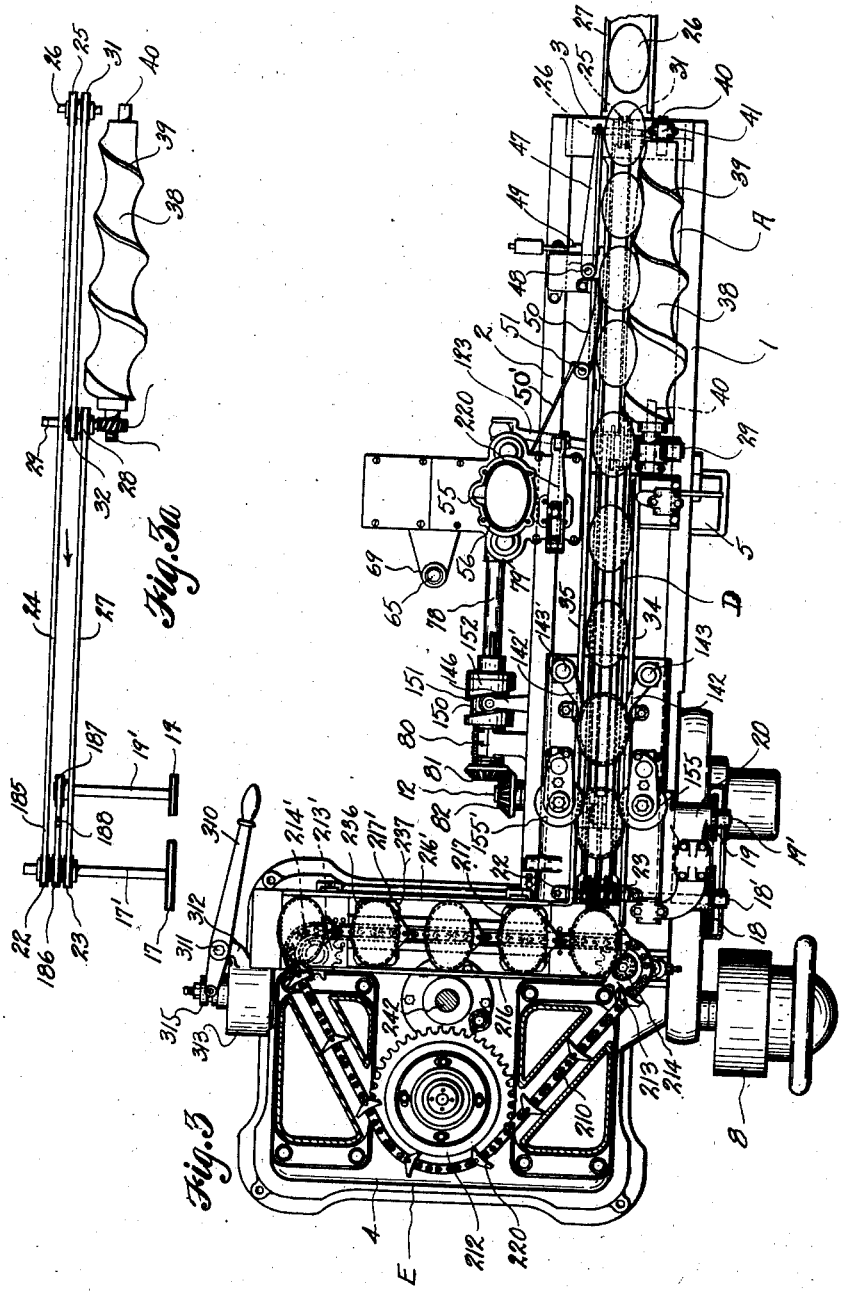

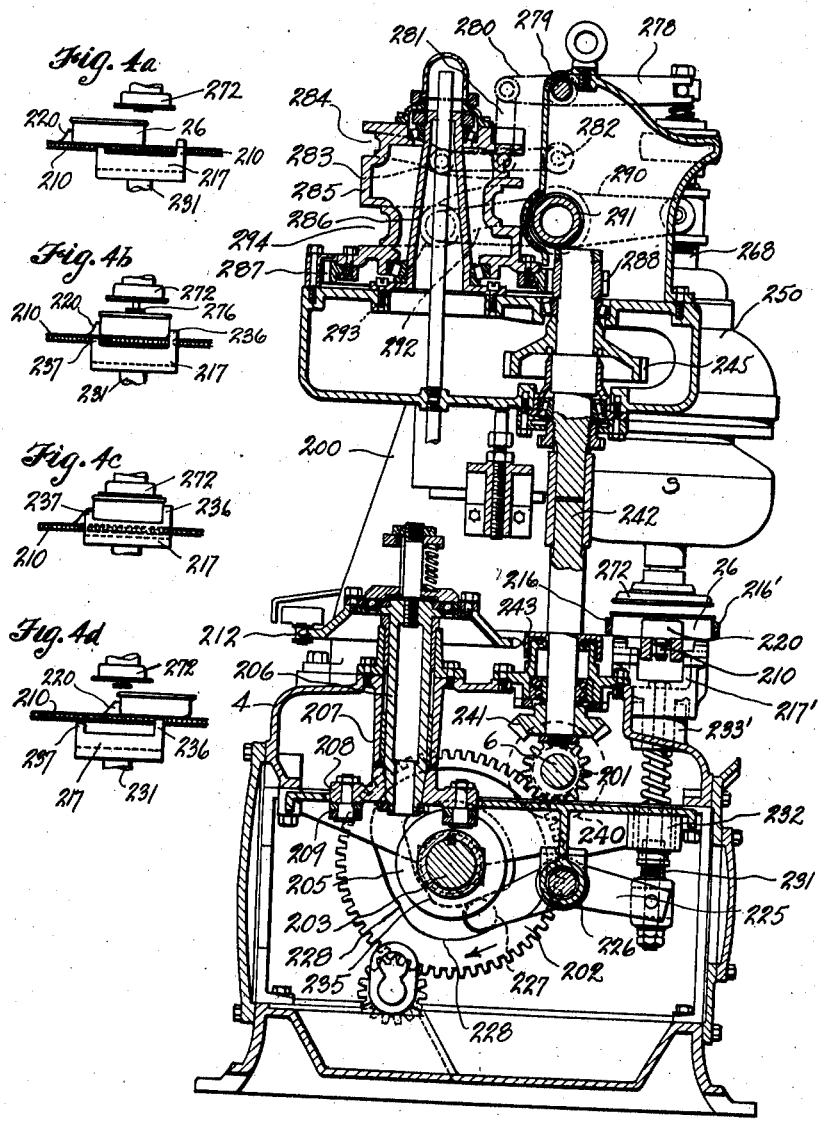

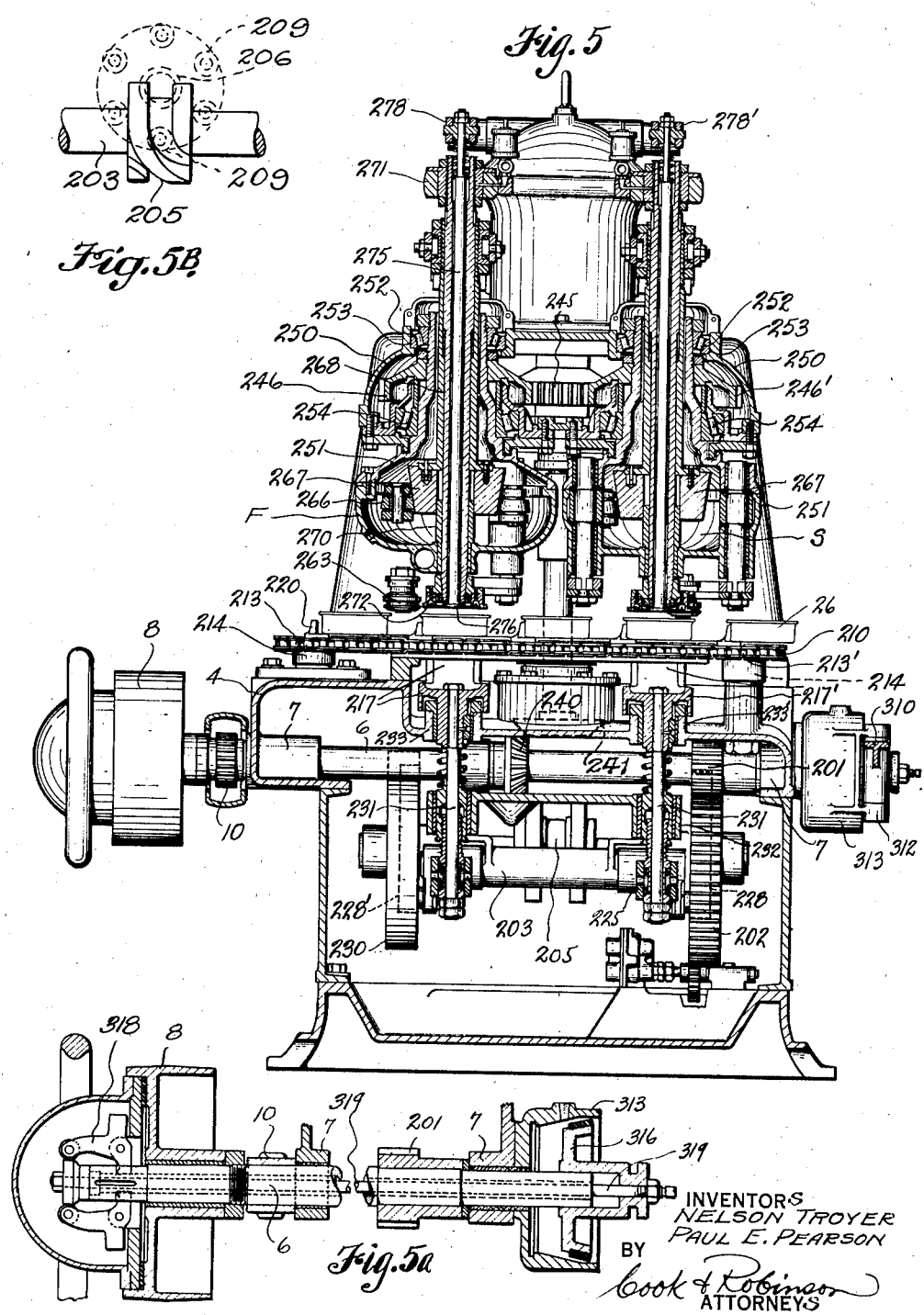

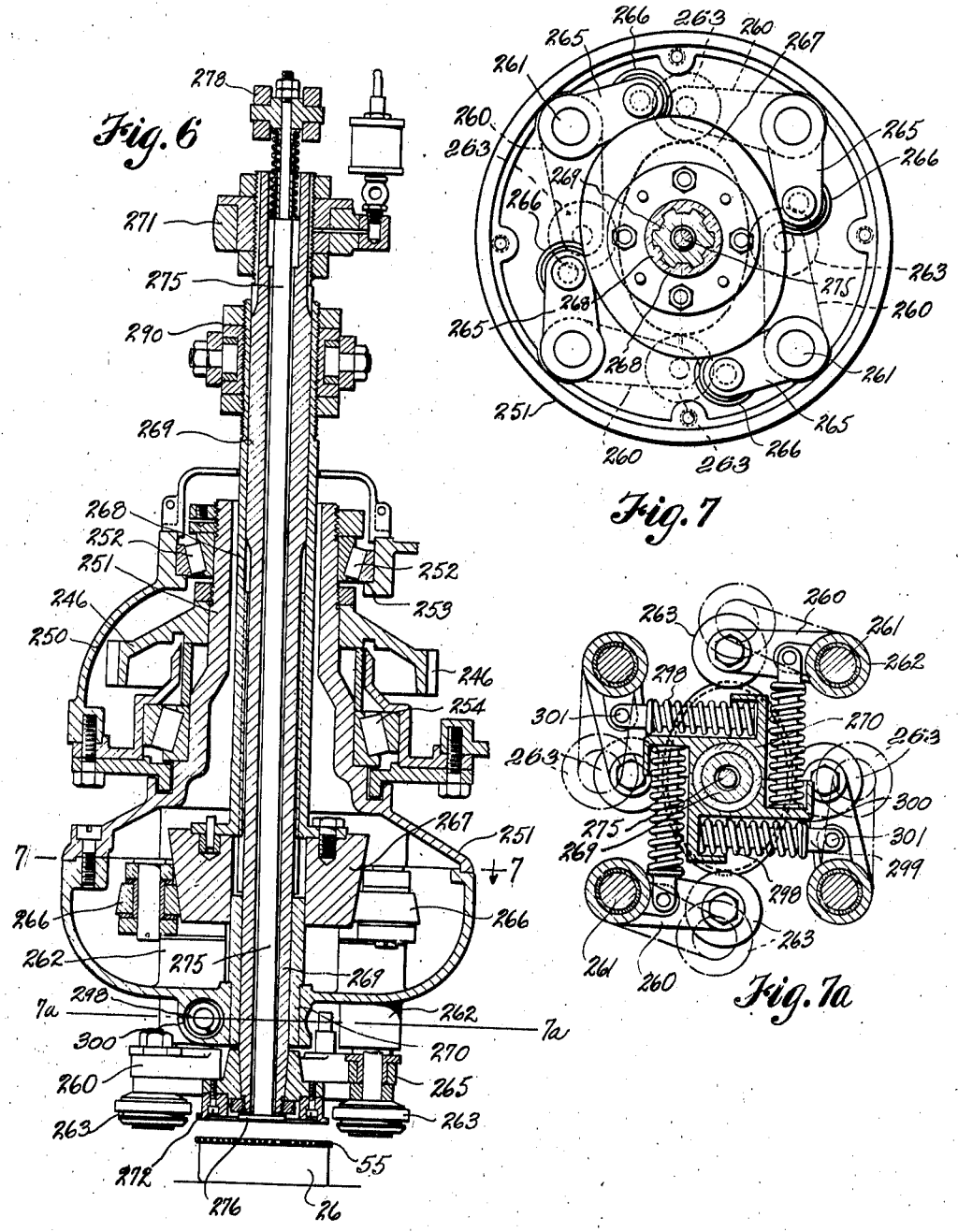

June 5, 1934.  N. TROYER ET AL  1,961,994
OVAL CAN SEAMER
Filed May 7, 1931   11 Sheets-Sheet 7
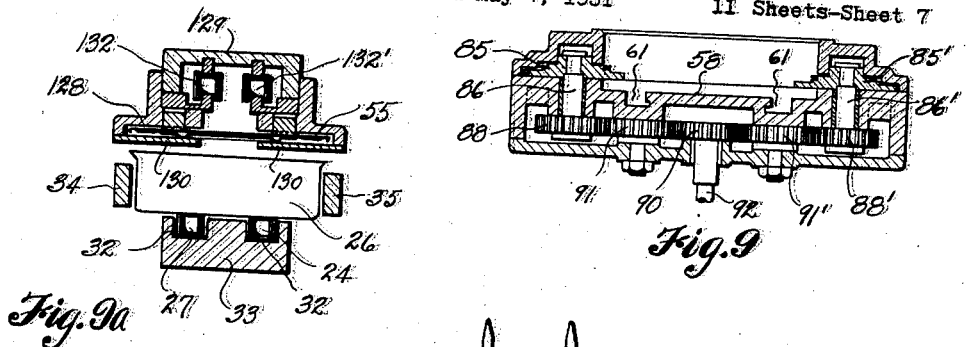
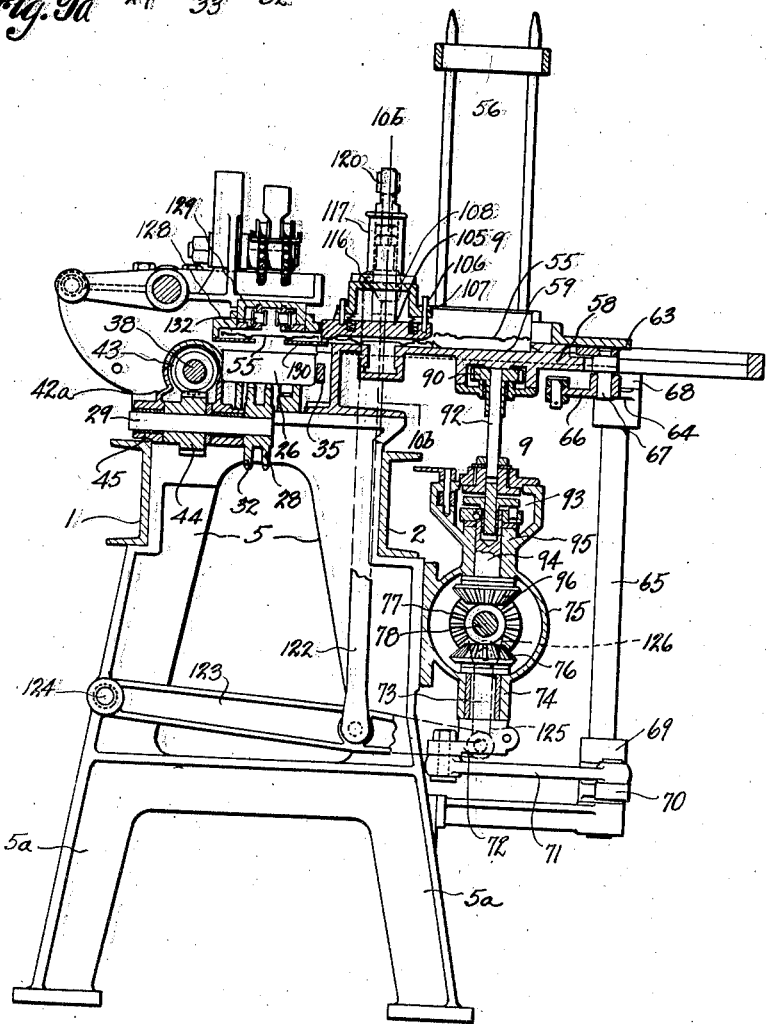
Fig. 8
INVENTORS
NELSON TROYER
PAUL E. PEARSON
BY
Cook & Robinson
ATTORNEYS June 5, 1934.　　　　N. TROYER ET AL　　　　1,961,994
OVAL CAN SEAMER
Filed May 7, 1931　　　11 Sheets-Sheet 8
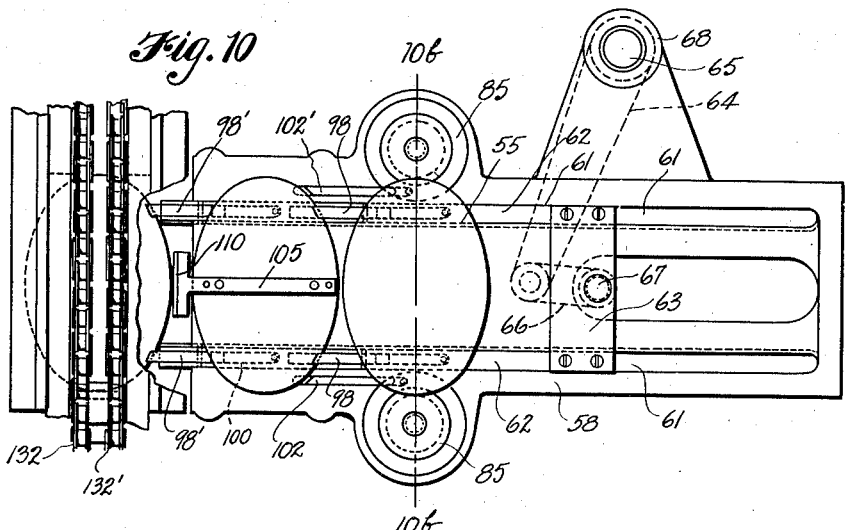
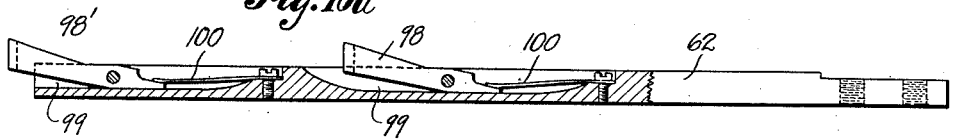
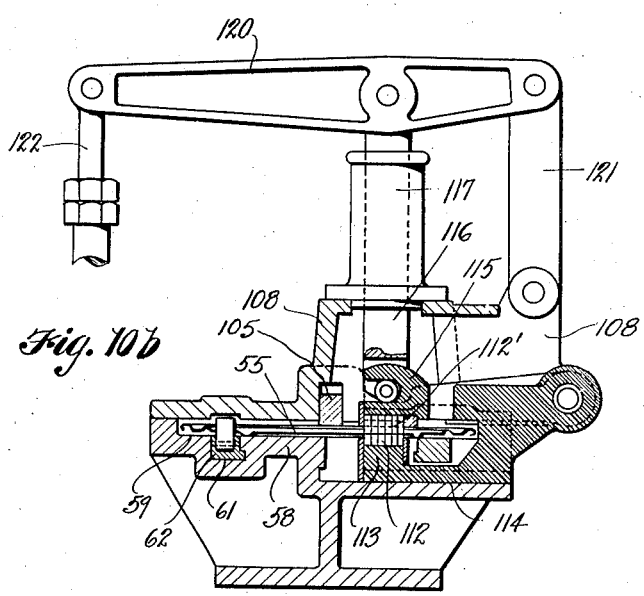
INVENTORS
NELSON TROYER
PAUL E. PEARSON
BY
Cook & Robinson
ATTORNEYS June 5, 1934.     N. TROYER ET AL     1,961,994
OVAL CAN SEAMER
Filed May 7, 1931     11 Sheets-Sheet 9

INVENTORS
NELSON TROYER
PAUL E. PEARSON
BY
Cook & Robinson
ATTORNEYS

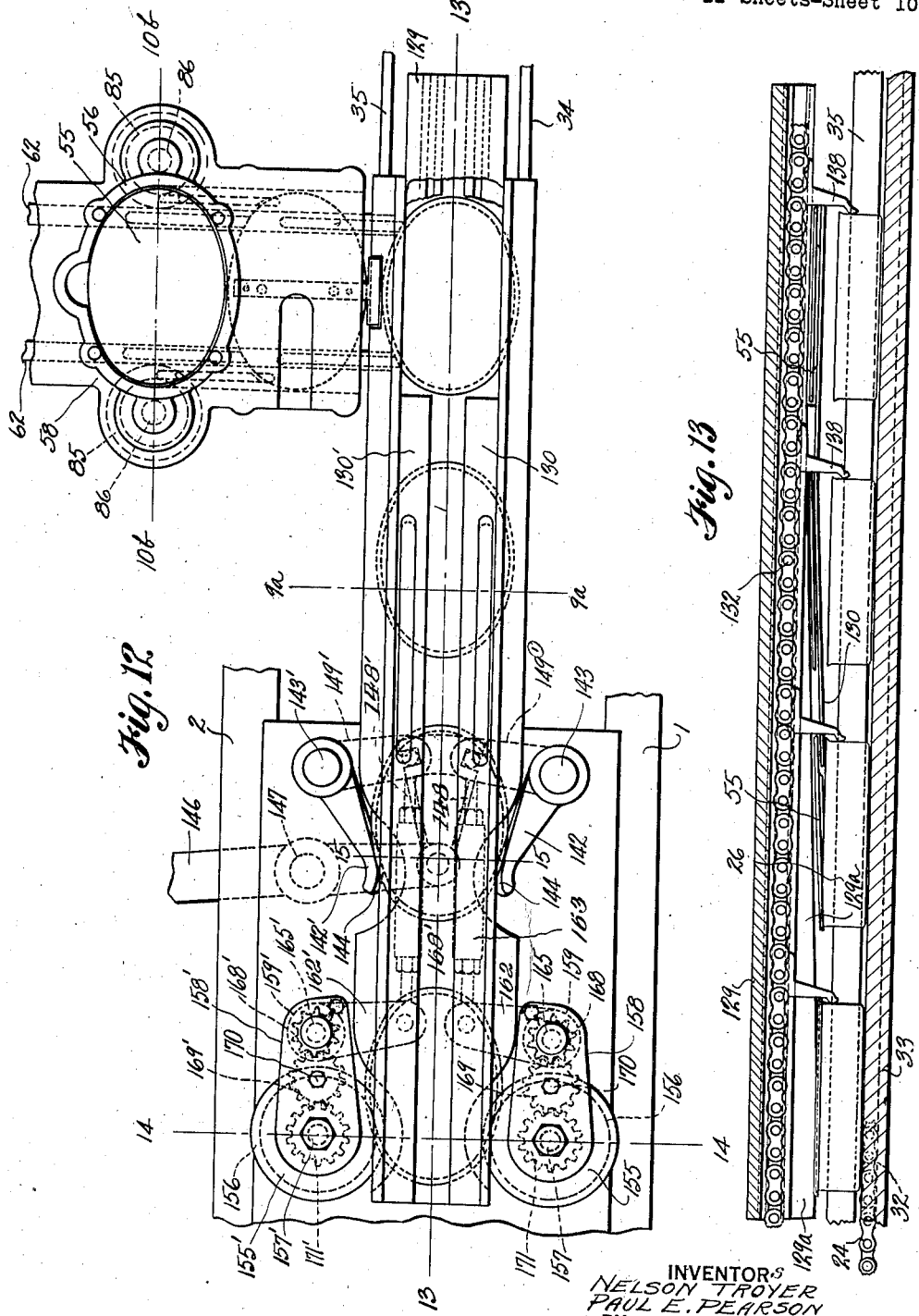

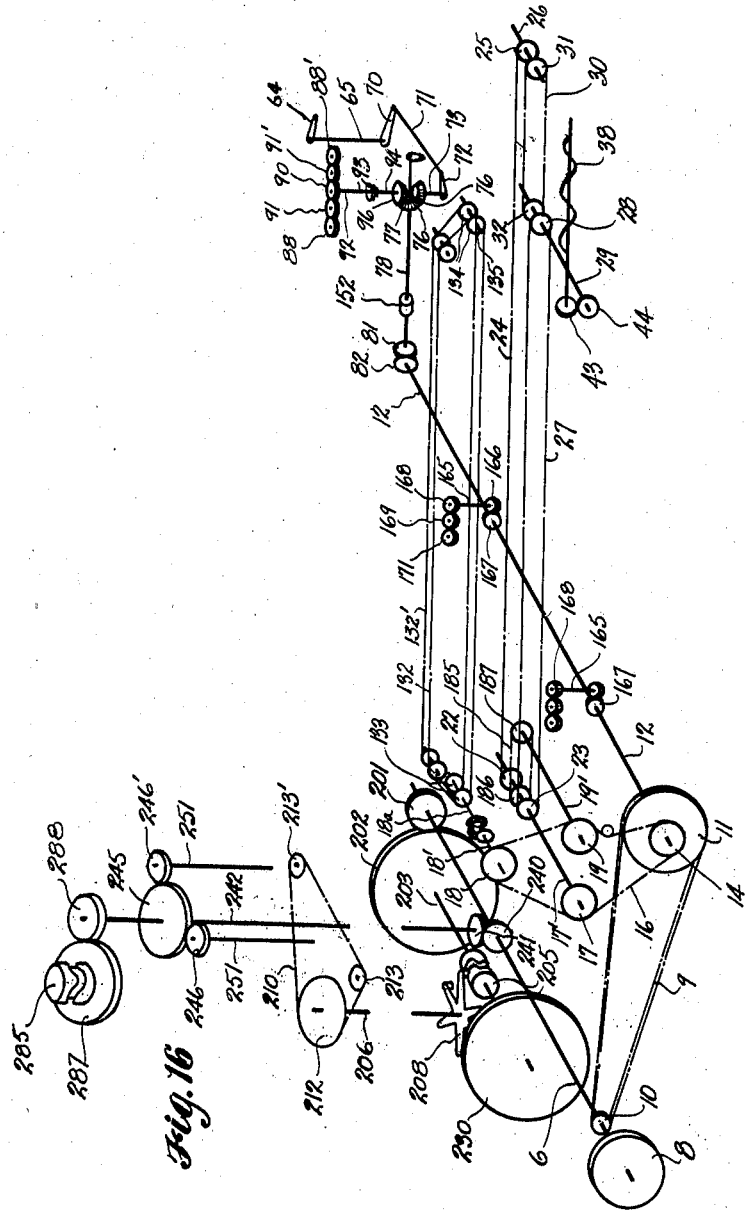

Patented June 5, 1934

1,961,994

UNITED STATES PATENT OFFICE 1,961,994

OVAL CAN SEAMER

Nelson Troyer and Paul E. Pearson, Seattle, Wash., assignors to Continental Can Company, Inc., New York, N. Y., a corporation of New York Application May 7, 1931, Serial No. 535,726

30 Claims. (Cl. 113—1)

This invention relates to can closing machines, and has reference particularly to machines for applying and then double seaming the top ends, or covers, to oval cans after the cans have been filled; the invention having for its principal object to provide a machine of that character which may be operated at relatively high speed to satisfactorily and without waste, apply the covers or ends to the filled cans and to then double seam them to the can body flanges in such manner as to provide hermetically sealed containers.

Cans that are comparatively flat and oval in outline are now extensively used for the canning of small fish, and it is the general practice in such canning, to so fill the cans that when the covers are applied thereto and pressed into place, the contents of the cans will be tightly packed. It is customary also to place a seasoning sauce on the top of the pack before the cover is applied to the can, and it is because of the customary high filling of the cans and the use of seasoning or flavoring sauce, that care must be exercised in applying the covers in order that excess contents of the cans will not be squashed out; this being a difficulty which heretofore has, to a very great extent, limited the rate at which the cans could be closed.

Explanatory to the invention it will here be stated that in the ordinary types of double seaming machines now used for closing cans of the oval type, the filled cans are delivered into the seamer and the covers are then brought into registration with the cans and are applied by the upward action of the pads supporting the cans. In such machines, action of the pads necessarily is very fast and as a consequence of the quick application of the covers to the cans, there is splashing and gushing out of the contents of the contents of the can rather than the desired packing within the can. This gushing out is not only wasteful and detrimental to the machine, but often leaves contents of a can partly ejected and thus materially interferes with the proper seating of the cover in the can mouth and the completion of an airtight seam.

In view of the above, it has been an object of this invention to overcome the disadvantages and undesirable features inherent in machines now generally used, by a novel assembling mechanism which applies the can covers to the cans so easily and gradually that the objectionable spilling and gushing out of contents is avoided; the assembling mechanism being so designed that it accurately alines the covers with the can bodies, and, in seating each cover, causes one end thereof to be applied to the mouth of the can body in advance of the other end, thus making possible an unusually easy application.

Another object of the invention is to provide novel seamer mechanism, associated with the assembling means, in which an exceedingly smooth inward and outward movement of the seaming rolls, required for the accommodation of the oval can, is effected through an arrangement of levers actuated by an oval cam which, by reason of a definite proportioning in lengths of levers used for the seaming rolls, requires major and minor axes of slight difference in length, yet effects the required movement of the seaming rolls for accommodating an oval can having major and minor axes that are of considerable difference in lengths.

It is also an object of the invention to provide novel devices whereby the covers and cans are brought accurately into registration for an easy application of the covers, and other devices whereby the covers, after being applied, are clinched to prevent displacement from the cans while delivered into the double seaming machine.

Another object of the invention is to provide marking means in connection with the cover feeding devices, for the application of characters or marks of identification to the covers prior to their being assembled with the cans.

Other objects of the invention reside in the various details of construction of the can and cover assembling mechanism; in the combination of parts whereby the cans and covers are properly and evenly fed into the machine and assembled together after the covers have been marked, and whereby they are then advanced successively, by intermittent movements to the first and second operation seaming spindles of the double seaming machine.

It is also an object of the invention to provide automatic control devices including means whereby the feeding of a can body to the machine without the delivery of a corresponding cover, for application to the can, will operate automatically to stop the machine.

Other objects of the invention reside in the various details of construction and in the combination of parts, and in their mode of operation, as will hereinafter be described.

In accomplishing these objects of the invention, we have provided the improved details of construction, the preferred forms of which are illustrated in the accompanying drawings wherein—

Fig. 2 is a plan, or top view, of the machine.

Fig. 3 is a horizontal section of the machine, taken substantially on the line 3—3 in Fig. 1, just above the can line.

Fig. 3a is a plan view of the can feed chains and their driving means.

Fig. 4 is an enlarged, vertical section on line 4—4 in Fig. 2; this being in a plane parallel with the longitudinal line of the machine and centrally through the seamer.

Figs. 4a, 4b, 4c and 4d are views illustrating successive positions of the lifting pads whereby the cans are raised from the guideway into position for seaming.

Fig. 5 is a vertical, transverse sectional view through the spindles of the double seamer, taken substantially on the line 5—5 in Fig. 2.

Fig. 5a is a sectional detail of the clutch and brake mechanism associated with the main drive shaft.

Fig. 5b is a plan view illustrating the indexing mechanism for the double seamer turret.

Fig. 6 is an enlarged, sectional detail of one of the spindles of the double seamer, particularly illustrating the conical cam for effecting the inward and outward travel of the seaming rolls to accommodate the oval can.

Fig. 7 is a horizontal, sectional detail taken substantially on the line 7—7 in Fig. 6, showing the lever mechanism and oval cam for actuating the cranks.

Fig. 7a is a section on line 7a—7a in Fig. 6, illustrating the springs for returning the seaming rolls to their outer positions.

Fig. 8 is a transverse, vertical section taken on the line 8—8 in Fig. 2, particularly illustrating the cover feed slides and the cover marker.

Fig. 9 is a sectional detail, taken on the line 9—9 in Figs. 2 or 8, illustrating the cover feed mechanism.

Fig. 9a is a cross sectional view of the can guideways, as on line 9a—9a in Fig. 12.

Fig. 10 is a plan view, particularly illustrating the cover feed slide bars.

Fig. 10a is a longitudinal section of one of the cover feed bars.

Fig. 10b is a sectional view taken on line 10b—10b in Figs. 10 and 12.

Fig. 12 is an enlarged, plan view showing a portion of the can and cover assembling guideway and the devices for alining the covers with the bodies and for clinching them on the body for delivery to the seamer.

Fig. 13 is a sectional detail on the line 13—13 in Fig. 12 illustrating the applying of the covers to the cans.

Fig. 16 is a diagrammatic illustration showing the relationship of the various driving gears, shafts and belts embodied in the machine.

Figure 1:
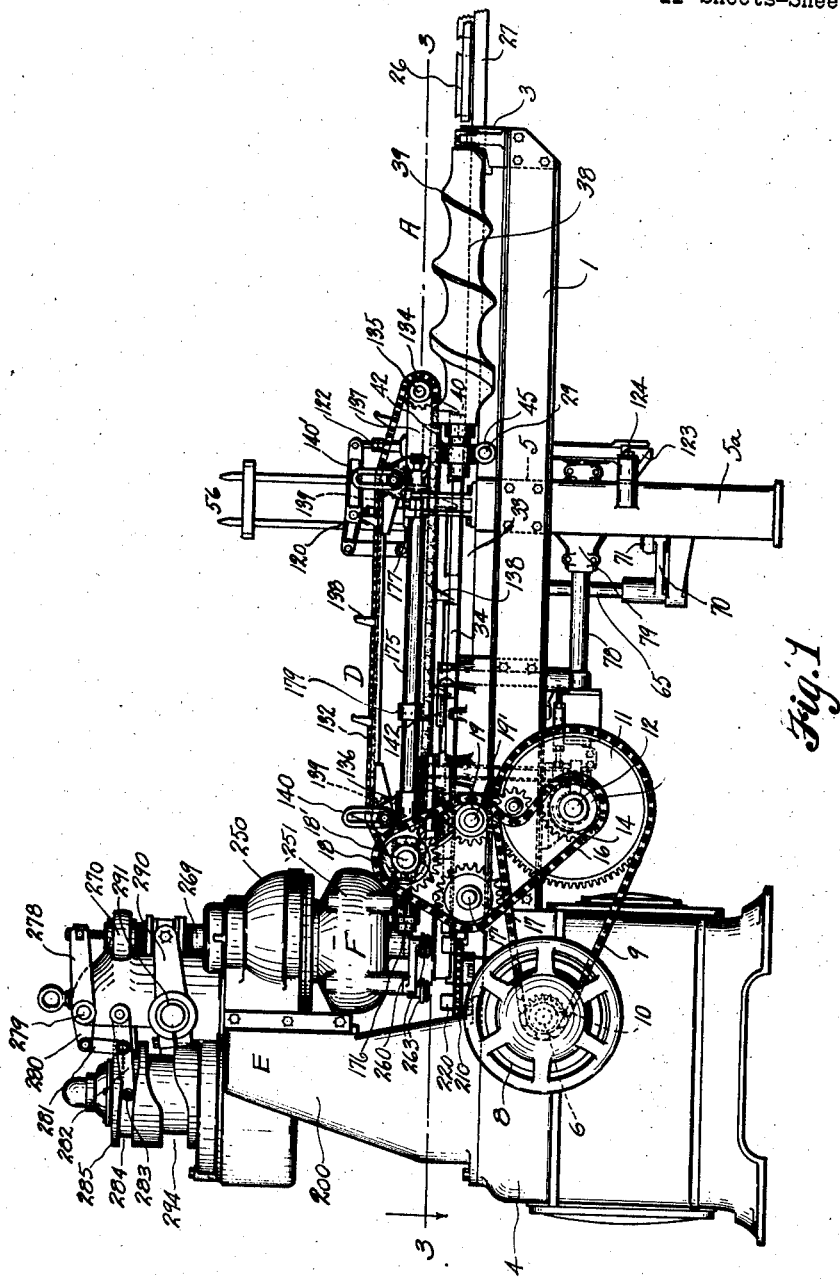
Fig. 1 is a side elevation of a can closing machine embodied by the present invention.

Referring more in detail to the drawings—

General description

Briefly described, the present machine comprises a feeding and timing mechanism whereby the filled cans are delivered into the machine in accordance with the delivery of covers or ends for placement on the latter during their period of travel to the double seamer; a marker whereby the can covers are individually marked for identification before assembly with the cans; an assembling mechanism for applying the covers to the filled cans and for clinching them in place thereon; and, finally, a double seaming machine whereby the covers or ends, after being clinched on the cans, are hermetically sealed thereto. The can feed mechanism is indicated generally in Figs. 1, 2 and 3, by reference character A; the end feed mechanism at B; the end marker at C, the can and cover assembling mechanism generally at D, and the double seamer in its entirety at E. These several parts of the machine are all interconnected in one complete machine, having one source of power, and operable under one main control lever.

The cans which are to be closed are oval in form and are shallow. Also, are flanged about their top edge in the usual manner. The covers therefor are provided with the usual countersink for seating down within the can mouth, and are flanged to overlie the body flanges to form the double seam now commonly used and well known in the art.

Referring more particularly to Figs. 1, 2 and 3, the can timing and delivery means; the end feed mechanism, the marker and the assembling devices, are supported by a horizontal frame structure comprising parallel channel beams 1 and 2, connected at their outer ends, by a transverse bar 3 and fixedly attached, at their inner ends, to the supporting frame, or base structure, 4 of the double seamer. This horizontal frame is substantially supported intermediate its ends by a transverse frame 5 formed with downwardly diverging supporting legs 5a.

Driving gearing and conveyer

As was previously stated, all the moving devices of this machine are under one main control and are driven from one main drive shaft with which suitable connections are made for driving the can delivery and end or cover feed devices, the marker, clincher and seamer. This drive shaft is designated by reference character 6 and it is mounted transversely of the machine within the base frame structure 4 on which the seaming mechanism is supported. It is revolubly mounted in suitable bearings 7—7 as shown in Fig. 5, and it is equipped at one end with a pulley wheel 8 over which a belt (not shown) may be extended to drive the machine. A suitable control lever, clutch and brake mechanism, later described in detail, is associated with the pulley wheel and shaft for controlling the starting and stopping of the machine.

Power for operating the can feed conveyers, the can end marker, the cover feed slides, can and cover assembling means, and cover clinching rolls, is transmitted thereto from the main shaft 6 through the medium of various gears, sprockets and chain belts which are illustrated in their functional relationship in the diagrammatic view Fig. 16. These driving connections, also clearly shown in Fig. 1, include a sprocket chain belt 9 which operates about a sprocket wheel 10 keyed on the shaft 6 adjacent the belt pulley, and about a relatively large sprocket wheel 11 that is keyed on a shaft 12 mounted transversely of and beneath the frame beams 1 and 2 near the seamer. This latter shaft, as is shown best in Fig. 11, is supported revolubly in bearings 13—13 which are fixed to the under flanges of the beams 1 and 2.

Figure 11:
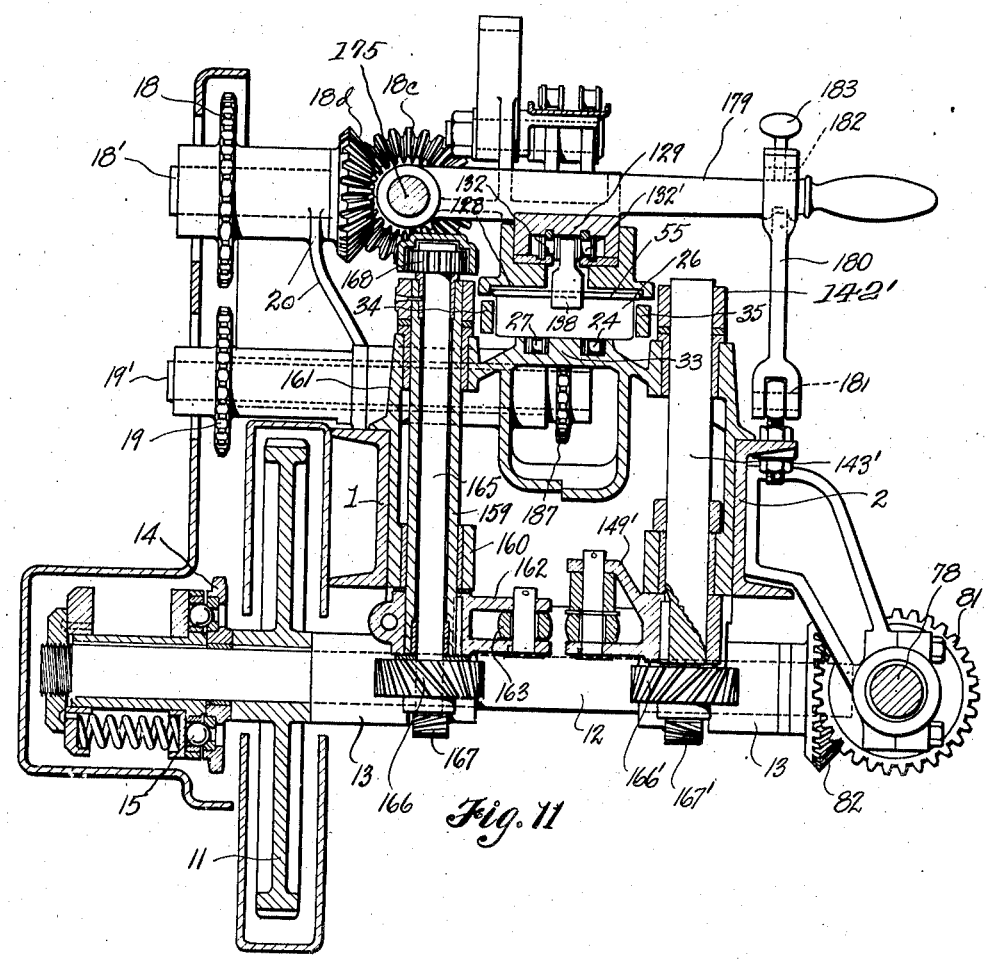
Fig. 11 is a transverse section, taken on the line 11—11 in Fig. 2, including the automatically releasable clutch.

A relatively small sprocket wheel 14 is mounted on the shaft 12 adjacent the outside face of sprocket 11, and this, in normal operation, is driven from the shaft 12 through the medium of a releasable ball clutch mechanism, indicated at 15 in Fig. 11, presently more fully described. A sprocket chain belt 16 operates about the sprocket 14 and is driven thereby and extends about and drives sprocket wheels 17, 18 and 19 that are fixed, respectively, to shafts 17', 18' and 19', all of which extend in a direction transversely of the frame structure and are rotatably mounted in bearings provided therefor in a bracket 20 mounted by the beams 1 and 2.

The driven shaft 17' has sprocket wheels 22 and 23, of the same size, keyed thereto in spaced relation and symmetrically arranged relative to the longitudinal axis of the frame. This shaft 17' drives conveyer chains on which the cans are advanced along the frame and are finally delivered to the seamer. By reference to Figs. 3a or 16, it will be observed that a chain belt 24 extends the full length of the frame structure and operates about the sprocket wheel 22 and about a sprocket 25 of like size on a cross shaft 26 at the outer end of the frame. Also a chain belt 27 is arranged parallel to belt 24 and this operates about the sprocket 23 and about a like sprocket 28 on a cross shaft 29 set somewhat within the outer end of the frame. A relatively short chain belt 30 operates about sprockets 31 and 32 fixed on cross shafts 26 and 29 respectively and this is set inwardly toward belt 24 to accommodate a timing screw, presently described.

The chain belts 24, 27 and 30, as shown in Fig. 3a, are parallel and are spaced apart a distance which will best accommodate the cans which are to be conveyed thereon. The upper runs of these conveyer chains operate within parallel guide grooves 32 provided therefor, as in Fig. 9a, in a supporting bed plate 33 that is fixed horizontally between the beams 1 and 2 lengthwise of the frame. Thus forming the base of a can guideway. Rails 34 and 35 are supported in parallel relation above the base plate 33 in properly spaced relationship to contain the cans between them without any lateral play and they accurately guide the cans in the application of the covers thereto, past the clinchers and finally to the seamer mechanism.

The filled cans, designated by reference character 26, may be delivered to the machine by any suitable means. In the present instance we have illustrated this simply as a feed chute 27 wherein the cans are delivered in succession onto the conveyer chains 24 and 30. They are then taken up, and timed and spaced in their delivery into the machine by a rotating timing screw 38 which has a suitable spiral thread 39 for this purpose.

The timing screw 38 is disposed parallel to the belts 24 and 30 and is provided with supporting spindles 40 at its ends which are rotatably supported at its inner and outer ends, respectively, in bearings 41 and 42; the former being a part of cross bar 3 and the latter being formed as a part of a bracket 42a fixed to cross frame 5. The timing screw is driven by a spiral gear 43 fixed on the spindle 40 at the inner end of the screw. This gear meshes with a spiral gear 44 on the cross shaft 29. This latter shaft, as shown best in Figs. 1 and 8, is rotatably mounted in a bearing 45 also formed as a part of the bracket 42a. The inner end of shaft 29 terminates substantially at the longitudinal center of the frame and mounts the sprocket wheels 28 and 32, and it thus serves as the medium through which the timing screw 38 is driven by the conveyer chain belt 27.

The timing screw is arranged adjacent one side of the guideway into which the cans, on entering the machine from chute 27, are advanced. At the side of the guideway opposite the timing screw is an elongated lever 47 pivotally mounted at one end, as at 48, to swing in a horizontal plane, so that its swinging end may bear against the cans, received from chute 37 to yieldingly urge them against the thread of the timing screw; the lever being urged inwardly by pressure thereagainst of a leg of a weighted lever 49 pivotally supported from the frame. There is also a second lever arm 50 adjacent the guideway mounted at one end by a pivot 51 with its swinging end yieldingly urged inwardly against the cans entering the machine. It is so arranged that, should a can be missing from the regular order of delivery by the screw, the arm will swing inwardly to actuate a certain clutch device which temporarily stops the end feed mechanism to prevent the delivery of a can end when there is no can to receive it.

*Cover feed and marker*

After the filled cans have been delivered into the machine in properly spaced order, the covers, or ends, are applied thereto. These covers, 55, are delivered into the machine from a stack in a storage hopper 56 supported at one side of the frame, as shown in Figs. 2, 3 and 8. The covers feed downwardly in the hopper by gravity and are ejected from its lower end, one at a time, and are advanced laterally by intermittent movements to a position registering directly above the path of the incoming cans. The hopper is supported on a base plate 58, (see Fig. 8), rigidly fixed to frame 5 to extend laterally of the direction of the beams 1 and 2 and it is formed with a guideway 59 within which the covers are advanced, and also with parallel grooves 61—61 in the base of the guideway in Fig. 9, for containing feed slides 62—62 reciprocally therein. These slides are connected rigidly across their outer ends as in Fig. 10, by a bar 63, and are reciprocated by means of a lever arm 64 that is fixed to the upper end of a vertical shaft 65 and is pivotally connected through the medium of a link 66 with a pivot pin 67 in the bar 63. The shaft 65 is mounted in upper and lower supporting bearings 68 and 69 extending laterally from the machine frame, and it is oscillated by a lever arm 70 fixed to its lower end; the lever arm 70 being pivotally connected at its outer end with one end of a link 71 which in turn connects with a crank 72 on the lower end of a vertical crank shaft 73, as seen in Fig. 8.

Shaft 73 is rotatably mounted in a bearing 74 formed integral with a gear housing 75 that is fixed to frame 5, as in Fig. 8. The shaft is driven by a bevel gear 76 keyed thereon, and meshing with a bevel gear 77 on a shaft 78 which is supported horizontally at the side of the frame, as in Fig. 3, in bearings 79 and 80, and rotatably driven by a gear 81 keyed thereon and meshing with a bevel gear 82 on the end of driven shaft 12, as shown in Figs. 3 and 11.

This arrangement of shafts, gears and levers provides that when shaft 12 is driven through its connection with main shaft 6, the feed slides 62 are caused to reciprocate in synchronism with the advancing movement of the can delivery devices and they operate to successively deliver the can ends or covers first to the marker, then into position for application to the cans in accordance with the advancement of the latter. The covers are then forwarded toward the seamer, and during this forward travel they are applied to the cans and are clinched thereon to prevent possible displacement in the machine before being finally seamed.

In Fig. 9 we have illustrated the means used for separating the can ends to insure their being delivered one at a time from the lower end of the hopper into the guideway for advancement by the slides 62 first into position for marking, then into position for their application to the cans. This can end separating means consists of a pair of circular knives 85—85' disposed at opposite sides of the hopper at its lower end, and fixed to shafts 86—86' rotatable in bearings 87—87' in the base 58. Gears 88—88' are fixed to the lower ends of the shafts and are driven from a centrally located gear 90 through the medium of idlers 91—91' which mesh with gear 90 and, respectively, with the gears 88—88'. Gear 91 is fixed on the upper end of a vertical shaft 92 which connects, through the clutch device 93, as shown in Fig. 8, with a shaft 94 rotatable in a bearing 95 formed as a part of housing 75, and at its lower end carries a bevel gear 96 meshing with the driven gear 77 on shaft 78.

The two can end separating knives 85—85' rotate in synchronism in the same direction, and each is formed with a blade of a spiral character, the blades being of opposite pitch and so arranged that, incident to each rotation their upper ends will simultaneously enter between the lowermost cover of the stack and the one next adjacent thereto to separate them, and thus on each rotation releasing the lower cover into the guideway 59 while the stack of ends is supported in the hopper. Each rotation of the knives delivers but one cover into the guideway.

As each can end is thus delivered, it is advanced by the next inward reciprocal action of the feed bars 62, first to a position for marking, then by the next inward reciprocal action, to the can guideway for advancement and application to a can body.

Each of the feed slides 62, as shown in Figs. 10 and 10a, is provided with downwardly yieldable pushers 98 and 98' contained in recesses 99 in the upper faces of the slides. These pushers are urged upwardly by springs 100 which bear thereagainst as shown in Fig. 10a. The pushers of the two slides are paired so that they co-operatively engage the covers as in Fig. 10, to advance them and at the same time hold them in proper alinement for entering the guideways.

The fingers 98 are at the inner ends of the bars and their function is to advance the covers from the hopper when released by knives 85 to the marking station, and the fingers 98' are at the outer ends of the bars and their function is to advance the covers from marking position to the guideway for assembly with the cans.

Assuming that the two slides 62 are at their outer limit of travel, and that a can cover has been delivered by the separating knives 85—85 into the guideway 59, the first inward reciprocal action of the slides causes the rear set of pushers 98 of the two bars to engage the released cover and to advance it to the marking station which is midway of the hopper and can guideway. During this first advance movement, the separating knives 85—85' operate to release another cover from the hopper. Then, as the feed slides are retracted, the fingers 98 yield downwardly as they pass beneath the cover and then snap up as they pass beyond it. Likewise, the forward fingers 98' yield downward as they are drawn beneath the can cover just advanced to the marking position, and snap up as they pass back of it. Then, on the next forward reciprocal movement of the feed bars, the first released cover is advanced by pushers 98' to the can guideway, and the second cover is advanced by pushers 98 to the marker station. Continued reciprocal action of the slides in like manner, successively delivers the covers from the hopper to the guideway in which they are each advanced to the can guideway.

The can ends or covers, when advanced to the marker station, are retained against moving rearwardly when the slides retract, by means of a pair of stop fingers 102—102' mounted in recesses in base plate 58 at outer sides of the slide. These fingers are spring pressed upwardly as are the fingers 98 and are downwardly yieldable to permit the ends to be advanced thereover, but they snap up as the ends pass therefrom to serve as stops to prevent possible rearward slipping. There is also a presser bar 105 centrally overlying the guideway 59 between the slides, which holds the covers against advance movement except when pushed forwardly by the slides. This bar, see Fig. 8, is held in position by pins 106 at its ends which are vertically slidable in guide openings 107 in an overlying bracket 108 and permit the bar to move upwardly or downwardly. Coiled springs 109 interposed between the bar 105 and bracket base urge the bar downwardly. This bar has an extension head 110 at its outer end (see Fig. 10), against which the covers will engage to prevent any inward displacement when the slides retract.

As each can end is delivered to the marking station, an identifying mark is applied thereto. For this purpose there is provided a base die, 112, contained in a holder 113 removably mounted in a seat 114 provided therefor in the base plate 58. The die is located in a position to engage with the under sides of the can covers when they are in the marking station, as is clearly shown in Fig. 10b. An upper die 112' is held in a block 115 carried at the lower end of a plunger or slide 116 that is reciprocally movable in a guide bearing 117 formed as a part of bracket 108. This plunger is reciprocally actuated to cause the upper die to move down against each cover as it comes to rest in the marking station, to co-operate with the base die to impress the identifying mark in the cover. This action of the plunger is effected by means of a lever 120 which is pivotally connected at a point between its ends to the upper end of the plunger, and pivotally fixed at one end to a pivot post 121 on bracket 108 and pivotally connected at its other end to a downwardly extended link 122 pivotally connected at its lower end to a lever 123 as in Fig. 8; the latter lever has pivotal connection at one end, as at 124 to frame 5, and at its other end is connected by a link 125 with a crank 126 on the end of rotating shaft 78.

With the above arrangement, each rotation of shaft 78 causes a downward reciprocal action of the plunger 116 and a consequent impression of an identifying mark by the dies, in the can cover. This action of the dies is so timed with respect to the delivery of can covers to the marking station, that each will receive the identifying mark during its period of rest at the marking station.

The advance movement of the can covers from the marking station places them directly above the can guideway on bed plate 33 and they are then forwarded along the guideway and ultimately applied to the cans. The mode of application of the covers, in this instance, is differentiated from the usual mode of application in that it is a relatively slow movement, and one end of the cover is advanced into the can mouth ahead of the other end.

It will be observed, particularly by reference to Fig. 8, that when the can covers are advanced into position above the cans, they will be supported in spaced relation thereabove within a guideway 128 formed in the underside of a top plate 129 longitudinally overlying the can guideway. This plate has longitudinally extending side rails integral therewith and has flange plates 130—130 fixed thereto; the covers or ends being slidably movable along the cover guideway on the flange plates and these are spaced apart to provide for the travel between them of pushers of a conveyer, presently described.

By reference to Fig. 13, it will be observed that the flange plates 130—130 and the can guideway are gradually inclined downwardly as they lead toward the seamer, so that as the covers are advanced therealong they are directed, gradually and easily, against the cans to which they are to be applied.

The conveyer means for advancing the covers along the guideway and for causing them to be brought into registration with the cans, comprises a pair of chain belts 132—132' which operate about driving sprockets 133—133, on a cross shaft 18a alined with shaft 18', and about sprocket wheels 134 on a cross shaft 135 above the delivery end of the feed screw. Shaft 18a is driven by a bevel gear 18b meshing with an idler gear 18c revoluble freely on a supporting shaft 175 and meshing with a driving gear 18b on the inner end of shaft 18'. Shaft 18a is supported in a bracket 136 and shaft 135 in bracket 137 which presently will be referred to. These feed chains move in unison, and fixed between them at definitely spaced intervals corresponding to the spacing of the cans, are pushers or fingers 138. The upper runs of these two belts are supported by idlers 139—139' adjustably carried by supports 140—140' formed with the brackets 136—137. The lower runs are slidable in guide grooves 141—141' formed in the plate 129 and the pushers are so arranged as to extend downwardly therefrom to engage the rear ends of the covers and to move them forwardly. Each finger also is of such length as to extend below the cover and to engage with its corresponding can to advance them together in proper registration for application of the covers. The belts 132 in this arrangement may move slightly faster than the lower feed belts 24—27 so that the cans cannot move ahead of the covers therefor.

In Fig. 13 we have shown that the downwardly inclined supports 130 on which the covers are advanced, terminate closely above the cans and that as each cover is advanced beyond the supports, it is pressed into the mouth of the can beneath it; it being observed that the forward end of the cover enters the can mouth first. The pressing of the covers into the cans is made positive by reason of the downward inclination of guiderails 129a along opposite sides of the plate 129 which overlie the opposite edges of the can guideway. These rails gradually incline downwardly in accordance with the inclination of flanges 130 and they serve as guides against which the covers engage and by which they are directed downwardly. These rails then continue past the clincher station so as to hold the covers seated tightly in the cans until the clinching has been effected.

Can body and cover alining means

Figure 15:
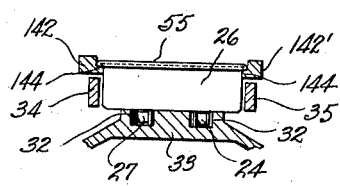
Fig. 15 is a sectional detail, taken transversely through the can guideway, as on the line 15—15 in Fig. 12.

Because of the oval form of the can covers and cans they have a natural tendency to turn sideways under the forward pushing of the conveyer fingers. Therefore, it is required that means be provided for preventing this and for accurately alining the cans and covers at the time the latter are applied. Such means is provided, as best illustrated in Figs. 12 and 15, wherein 142—142' designate a pair of arms that are fixed at opposite sides of the can guideway to the upper ends of shafts 143—143' and which extend forwardly and inwardly therefrom in converging relation and in such manner as to serve as guides against which the opposite sides of the forward ends of the covers and cans both engage as they are forwardly advanced. These arms, as is clearly shown in Fig. 12, receive the forwardly rounded end portions of the cans and covers thereagainst and they operate to bring the cover and can accurately into registration. Then, as the can and cover are advanced, the arms first swing outwardly and then inwardly exactly in accordance with the increase and decrease in width of the parts to still hold them in registration. It will be observed by reference to Figs. 12 and 15 that the end portions of the arms 142 are rounded and that they also have flanges 144 along their lower edge portions to extend beneath the cover and to engage the can sides; this being required by reason of the fact that the can bodies are of lesser width than the covers.

The means which is provided for actuating the arms 142—142' inwardly and outwardly comprises a horizontally mounted rocker lever 146 that is pivoted in the frame, as at 147, and which has its inner end connected pivotally to links 148—148' which, in turn, are connected with short lever arms 149—149' fixed to the lower ends of the shafts 143—143'. At its outer end the rocker lever carries a roller 150 that is contained in a cam groove 151 in a cam 152 fixed on shaft 78. This arrangement provides that with each rotation of shaft 78 the shafts 143—143' are oscillated to swing the arms 142—142' outwardly and inwardly a definite distance, and this movement is accurately timed with the advancement of the cans and covers, so that the arms will receive the forward ends of the cans and covers thereagainst to bring them properly into registration, then will open apart in accordance with the advancement of the can and cover, then again will close together to still hold them properly alined while the covers are pressed into place.

Cover clinching means

Figure 14:
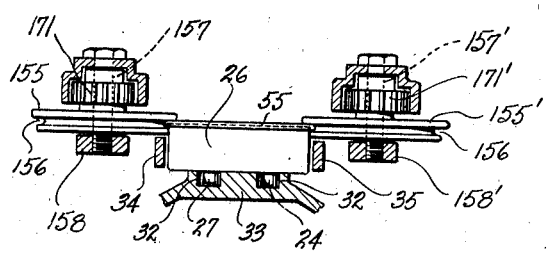
Fig. 14 is an enlarged cross sectional detail as on line 14—14 in Fig. 12, showing the clinching rolls in the cover and body assembling means.

It is also desired that the covers be clinched on the can flanges prior to delivery to the double seamer and this is done just after the covers have been fully seated in the cans. The clinching devices are shown best in Figs. 12 and 14, wherein 155—155' designate clinching rolls that are disposed at opposite sides of the can guideway and which have peripheral grooves 156 for receiving therein the cover and body flanges, as in Fig. 14. These rollers are carried rotatably on stub shafts 157—157' at the ends of arms 158—158' fixed to the upper ends of vertically disposed sleeves 159—159' rotatable in bearings 160 in a frame structure or bracket 161 fixed between the beams 1 and 2, as shown in Fig. 11. These sleeves have arms 162—162' fixed to their lower ends and these are connected by links 163—163' with the lever arms 149—149'. This provides that the sleeves will be oscillated in accordance with inward or outward swinging of the alining arms 142—142' and will thereby cause the clinching rolls to be moved inwardly against the flanges at opposite sides of the cans to curl or clinch the cover over the rim or flange of the body so that the cover will be held securely in place for delivery to the seamer. The extent of the clinching is determined by the extent to which the rollers are moved inwardly.

In order that the clinching operation will be easy and not be like that of pushing the cans through a restricted passage, but more that of rolling a flange, we provide for driving the clinching rolls in accordance with the travel of the cans. This driving of the clinching rolls is done through the use of shafts 165—165' rotatably contained within the two sleeves 159—159' and provided at their lower ends with driving gears 166—166' operating in mesh with driving gears 167—167' on the cross shaft 12. At their upper ends the shafts have spur gears 168—168' keyed thereon and these have driving connection, through idler gears 169—169', carried on pins 170 in the arms 158—158', with gears 171—171' fixed on the clincher roll supporting shafts 157—157'. The geared drive provides that the clinching rolls are continuously driven and have a sort of forward driving grip or contact with the can flanges as the cans are advanced between them. The inward and outward swinging action of the roller carrying arms is accurately adjusted to be only that necessary for a proper clinching action.

After the covers have thus been applied and clinched on the cans, the cans finally are advanced by the conveyer chain pushers 138 to the double seaming machine, but in order that the cans after having the covers clinched thereon, may be advanced ahead of the pushers to give ample clearance for the latter as the chains pass about the supporting sprocket wheels 133—133, we have provided a short extractor chain belt 185. This belt operates about sprocket wheels 186—187 that are disposed between the discharge ends of belts 24 and 27 as shown in Figs. 3a and 16. Sprocket wheel 187 in this instance is keyed on shaft 19' and is driven thereby, while sprocket wheel 186 rotates freely on shaft 17' between sprockets 22 and 23. This extractor belt has attachment links interposed therein carrying pushers 188 for engaging the cans to push them forwardly into the seamer from the ends of belts 24—27, and since gear 19 is somewhat smaller than gear 17, the shaft 19' is driven at a faster rate than shaft 17' and causes the cans to be advanced ahead and clear of the pushers 136 on the chain belts 132—132'.

For the convenience of opening up the can guideway to give easy access to cans therein, for inspection or for clearing out jambs, the overlying plate 129 in which the covers are advanced, and the supporting brackets, gears and chains associated with the cover conveying apparatus, are hingedly mounted to swing upwardly and to the side of the frame about a longitudinally extending shaft 175 supported at its end in brackets 176—177 fixed on the frame beam 1. This shaft has the brackets 136 and 137, which carry the top plate 129, and the conveyer chain gearing, fixed thereto, and it also has a lifting lever 179 fixed thereto, as in Fig. 11, which may be lifted upwardly to thereby swing the cover guideway plate and conveyer devices upwardly and clear of the can guideway. The lever 179 may be locked in its lowered position by a clamping link 180 pivotally fixed by a bolt 181 to beam 2 and having a laterally recessed upper end portion 182 for receiving the lever, with a clamp screw 183 adapted to be tightened against the lever to retain it in the recess.

Seamer mechanism

The seamer which is employed in connection with this machine, is that which, in the trade, is referred to as a two-spindle machine, one spindle being designed to perform the first seaming operation on each can, and the other spindle operating to complete the seam. These two spindles, and devices associated therewith, are substantially alike in construction and in mode of operation, and both are operated by a common connection with the main drive shaft 6. In Figs. 1 and 2, the seamer mechanism is designated in its entirety by reference character E, and in Fig. 5 the spindle for the first seaming operation is designated by character F and that for the second seaming operation by character S. The cans, as will presently be described, after being received from the clincher, are advanced by intermittent movements successively to the seaming spindles F and S and finally are delivered from the machine with seams completed.

The seamer mechanism comprises the rectangular base housing 4 to which the frame beams 1 and 2 are bolted. Erected upon the base housing 4 is an upper frame 200 which supports the seaming spindles F and S and the mechanisms associated therewith which are driven by connection with the main drive shaft 6.

By reference to Fig. 5 it will be observed that shaft 6 is provided near one end and within housing 4 with a gear 201, and this meshes with and drives a relatively large gear 202 keyed on a cross shaft 203 supported somewhat below and parallel with shaft 6 in bearings 204—204 fixed within housing 4. On shaft 203 is an indexing cam 205 which operates to intermittently rotate a vertical shaft 206 revolubly contained in a bearing 207 formed in the top wall of housing 4, as best disclosed in Fig. 4. This shaft 206, as presently will be described, drives a conveyer chain whereby the cans 26, on entering the seamer mechanism, are taken up and are intermittently advanced in succession to the seaming spindles. The indexing cam 205 has a circumferentially directed groove 205' formed therein, opening at its ends to opposite sides of the cam. The shaft 206 has a wheel 208 fixed to its lower end overlying the cam and this wheel is provided on its under side with six concentrically arranged and equally spaced rollers 209 adapted to be received successively into the cam groove 205'; it being understood that the groove is formed straight about the cam except at its ends which curve outwardly in opposite directions to opposite sides of the cam so that as each roller leaves the cam at one end of the groove, it rotates the wheel 208 so that the next roller on the wheel is caused to enter the other end of the groove, thus each turn of the cam causes the shaft 206 to remain stationary while a roll 209 is within the straight part of the groove, then to be rotatably advanced after this definite period of rest, through exactly one-sixth of a revolution.

The can conveyer mechanism associated with the double seamer comprises a conveyer chain belt 210, which, as shown best in Fig. 3, extends about a driving sprocket wheel 212 that is keyed on the upper end of the shaft 206, and about two relatively small supporting sprocket wheels 213—213' mounted on short shafts 214—214' secured in the top wall of housing 4 in symmetrically spaced relation relative to shaft 206. The conveyer chain belt 210 operates in a horizontal plane, somewhat spaced above the top wall of housing 4, and the run of the belt between the sprockets 213—213' is centrally within the base of a can guideway formed by a base plate 215 and spaced side rails 216—216'. This guideway is formed as a continuation of the guideway from the assembling mechanism but at a right angle thereto, and it passes directly through the axial lines of the two spindles F and S of the double seamer.

For the purpose of taking up and advancing the cans along the guideway, the chain 210 is provided at accurately spaced intervals with shoes or pushers 220 for engaging the cans, and these pushers are shaped in accordance with the curvature of the can body wall to prevent the cans turning in the guideway.

The cans, with covers clinched thereon, are delivered in regular timing in an endwise direction into the guideway of the seamer, and immediately after its delivery each can is advanced, incident to the intermittent movement of the conveyer chain 210, to a position axially alined below spindle F and directly over a vertically movable pad 217 which operates in timed order, while the can is at rest, to lift the can into position for the first seaming operation thereon. A second reciprocal movement of the conveyer advances the can from the first spindle to an idle position between the spindles. Then a third movement advances it in axial registration with the second operation spindle and directly over a pad 217' whereby it is then lifted during a period of rest into position for the second seaming operation.

Elevating of the pads is accomplished by mechanism shown best in Figs. 4 and 5 wherein 225 designates rock levers pivotally supported by pivots 226. The inner ends of these levers carry rollers 227 and the roller of one lever is contained within a cam groove 228 in the inner face of gear wheel 202, and the roller of the other lever is likewise contained in a similarly formed groove 228' in the inner face of a wheel 230 fixed on shaft 203. At their outer ends the levers have operative connection with push rods 231 slidable through guide bearings 232, as in Fig. 5, and which are connected at their upper ends respectively to the pads 217 and 217' which are held against rotative movement on guide bearings 233—233' in the top wall of housing 4.

The cam wheels 202 and 230 are so timed in their rotation, and the cam grooves 228—228' are so formed therein that, during each advance movement of the cans by the conveyer chain 210 whereby they are brought into axial alinement with the seamer spindles directly above the pads 217—217', the push rods 231 are given a short initial upward movement incident to the cam rollers passing into portions of the cam grooves of larger radius, as at 235 in Fig. 4 and this rocks the levers 225 to just slightly elevate the pads to bring stops 236 at the forward edges of the pads into position to be engaged by the cans to prevent their overrunning their intended positions. Then after the cans have come to rest, there is a second upward movement of the push rods, caused by the cam rollers passing in portions of the cams of still larger radius. This second upward movement of the pads seats them against the cans and elevates the cans to proper position for seaming. It also brings stops 237, which are formed on the pads opposite the stops 236, against the other side edges of the cans to positively hold the cans from being displaced from the pads under action of the seaming rolls.

In Figs. 4a, 4b, 4c and 4d, we have illustrated, first, the position of the pad while the can is being advanced to seaming position.

In Fig. 4b is shown the position of the pad after its initial upward movement which places its forward stops 236 in position for stopping the can. In Fig. 4c is shown the pad in its fully raised position with the rear stops 237 engaging the rear edge of the can in opposed relation to stops 236.

By reference to Fig. 4, it will be observed that the pads 217—217' are recessed in their top surfaces for passage of the conveyer chain 210 therethrough. It is also observed that the forward stops are longer than the rearward stops so that they may move into position to stop the can without any interference to the can by the rear stops.

After each seaming operation the pads and cans are lowered to again seat the cans in the guideway for advancement incident to the next advance movement of the conveyer chain.

The two seaming spindles and the mechanisms directly associated therewith are driven by connection with shaft 6 as shown in Fig. 4 wherein 240 designates a bevel gear keyed on shaft 6. This gear drives a bevel gear 241 keyed on the lower end of a vertical shaft 242 which extends through bearings 243 in the housing 4 and 244 in the upper frame structure and at its upper end has a gear 245 keyed thereon which meshes with and drives gears 246—246', respectively, for revolving the spindles F and S.

The spindles, as shown in Figs. 5 and 6, are supported by integrally cast housings 250 that are bolted securely to the upper frame structure 200. Each housing 250 rotatably mounts therein a spindle head 251 supported about its upper end portion by thrust bearings 252 contained in a seat 253 in its corresponding housing 250 and also by a lower set of thrust bearings 254. The spindles are alined axially with their corresponding can lifting pads 217 and 217', as shown in Fig. 5, and are revolved in their supporting bearings by driven gears 246—246' which are fixed thereto just below the bearings 252 and both mesh with the driven gear 245.

At the lower end of each spindle head there is mounted a plurality of levers 260, see Fig. 7, each of which is fixed to the lower end of a pivot shaft 261, which is rotatably contained within a bearing 262 in the lower end wall of the spindle head. These pivot shafts are equally spaced apart and are at equal radial distances from the axis of the spindle, and each lever rotatably mounts a seaming roll 263 at its end.

Fixed to the upper ends of each of the pivot shafts 261 are lever arms 265 of equal lengths but shorter than levers 260 and which, at their ends, mount conical, upwardly tapered cam rollers 266, all of which rollers operate in rolling contact with a downwardly tapered oval cam 267 which is fixed rigidly to the lower end of vertically adjustable sleeve 268. Sleeve 268 is slidable upon a tubular shaft 269 contained axially within the spindle and supported at its lower end within a guide bearing 270 in the lower end of the spindle head, and held rigidly at its upper end in a bracket arm 271 integral with the housing 250. At its lower end, below the end of the spindle, the shaft 269 mounts an oval chuck 272 against which the cans are lifted by the pads 217 or 217' for seaming; these chucks conforming in shape to, and fit snugly within the countersink of the can covers, and thus back up or counteract the inward pressure of the seaming rolls 263 in forming the seam.

Extending lengthwise within the tubular shaft 269 of each spindle is a push rod 275 provided at its lower end with a pad 276 for flatly engaging the tops, or covers, of the cans brought into position beneath it. At their upper ends, the rods 275 have slightly yieldable connections with lever arms 278—278' fixed to a cross shaft 279 rotatably mounted on the top of the frame structure. The shaft 279 has connection through a lever 280 fixed thereto, and a link 281 with a pivoted cam lever 282. Lever 282 has a follower, 283, contained in a cam groove 284 of a cam 285 that is rotatably mounted on a vertical spindle 286 on frame 200, as shown best in Fig. 4. The cam has a gear 287 bolted thereto and driven by a gear 288 on the upper end of shaft 242 and the action of the cam and levers 278 is to move the push rods 275 downwardly as the cans are brought into alinement with the pads 217—217', and to thus engage the pads 276 with the can covers. The rods then move upwardly with the lifting of the cans to seaming position, then after seaming is completed, move downwardly to unseat the cans for the chucks 272 and positively position them in the guideway to insure their being properly taken up by the conveyer chain when it again moves forwardly.

The function of the downwardly tapered oval cams 267 is to control the action of the seaming rolls 263 so that they will not only follow the outline of the oval cans as the spindles rotate, but also will be adjusted inwardly for closing or flattening the seam during each seaming operation.

It will be observed, by reference to Fig. 6, that the raised position of the cam 267 places the rollers 266 in contact with its smaller end. Therefore, lowering of the cam will move the cam rollers outwardly and this, by reason of the leverage provided, as shown in Fig. 7, will swing the seaming rolls 263 inwardly.

Upward and downward shifting of the cams 276 is effected by upward and downward movement of their supporting sleeves 268, which, at their upper ends have threaded adjustment with ends of levers 290 fixed on a horizontal shaft 291 rotatably mounted in the upper part of frame structure 200. Shaft 291 has a cam lever 292 fixed thereto and this has a follower 293 at its end contained in a cam groove 294 incircling the cam 295 so that rotation of the cam actuates both sleeves upwardly and downwardly together and in proper synchronism with movement of pads 217—217' for the seaming operation.

As the cans are lifted by their respective pads 217—217' into seaming position against the chucks 272 of the seaming spindles, the cams 267 are actuated downwardly to bring the seaming rolls 263 inwardly against the peripheral flanges of the cans for effecting the curling in and closing of the seams as is well known in the art. Then, after the seams are formed, the cams 267 are raised to permit outward swing of the seaming rolls clear of the seams. This outward movement of the rolls is effected by the pressure of coiled springs 298 against slides 299 contained in guides 300 in the lower ends of the spindles, as shown in Fig. 7a, and which connect pivotally, as at 301, to the levers and thus yieldingly urge them outwardly.

A feature of this particular construction resides in the proportioning in lengths of the lever arms 260 and 265 for actuating the seaming rolls, and the formation of the cams 267 for actuating them. It will be observed, by reference to Fig. 7, that the length of the major axis of the can shown in dotted lines, is quite long relative to its minor axis. This naturally calls for considerable inward and outward swinging movement of the seaming rolls in following the seam and in most instances such movement would create a detrimental and destructive vibration in the seaming devices. However, in the present instance the levers 260 which carry the seaming rolls are made quite long with respect to the lengths of levers 265 which carry the cam rollers 266 and therefore the difference between the major and minor axes of the controlling cams may be proportionately less; that is, the cams 267 may be made more nearly round than the cans, and therefore the rollers which follow the cams will have a much easier and more satisfactory seaming action than if the cams were of the same elongated shape as the cans.

It is well to state here that such an arrangement of cams and levers is well suited to other can shapes, and it is not the intention that it be confined in use to this oval can but that it be applied to all irregular shapes, such as rectangular elliptical, half round, etc.; it being only necessary to provide cams of proper contour to adapt the machine to any selected shape of container.

The particular advantage of this seamer is brought about by the proportioning of levers which makes possible the seaming of a can having abrupt and irregular turns, by a seamer mechanism in which the controlling cam is comparatively even, and thus overcomes jumping or vibrating of the mechanism.

*Control means*

For manual control of the machine, we have provided a starting and stopping hand lever 310. This is supported by a pivot 311 in a bracket 312 formed as a part of a brake drum 313 fixed to the main housing 4 about one end of shaft 6. This lever has a yoke 314 operatively connected through the mediacy of a collar 315 with a clutch cone 316 that is slidably keyed on shaft 6 and movable by means of the lever from and against the brake drum. Pulley wheel 8 is operatively connected to shaft 6 by a clutch mechanism indicated at 318, and this clutch is shifted into and out of gear by a shipper rod 319 contained longitudinally within shaft 6 and which is connected with the collar 315 so that when hand lever 310 is actuated inwardly to set the clutch and thus start the machine, it simultaneously releases the brake. Likewise, when the hand lever is pulled outwardly to release the driving clutch, it sets the brake to stop the machine.

The automatic "no can, no top" mechanism operating under control of the lever 50 and clutch mechanism 93, as shown in Figs. 2 and 8, will not be described in detail herein, as it forms the subject matter of another application, except to state that in the event no can enters the machine in proper order, the lever 50 will swing inwardly, and this action, through the medium of a connecting rod 50', releases the clutch 93 to temporarily disconnect the driving connection between the shaft 94 and cover feed slides, and thus prevents the delivery of a can cover. As soon as proper feed of cans is resumed, the clutch again provides proper driving connection with the feed slides. Likewise the automatic, disrupting clutch designated at 15 in Fig. 11 which operates to disconnect the drive of the machine in the event of a jam occurring, will not be described in detail as it forms the subject matter of another application, except to state that this clutch provides a yieldable connection which under abnormal strain provides slippage between the driving sprocket 14 and the driven shaft 12.

Operation

Assuming that the machine is so constructed, its operation, briefly described, would be as follows:

When hand lever 310 is pushed inwardly, it sets the clutch 318 so that pulley 8 will drive shaft 6, and at the same time it releases brake 316. Shaft 6 operates through chain belt 9 to drive the various conveyer chains for feeding cans and covers into the machine and for operating the marker, alining arms and clinchers.

The filled cans 26 delivered to the machine in the feed chute 27 are taken up in succession and delivered by the timing screw 38 in properly spaced order into the can guideway for advancement by the conveyer chains. In synchronism with the action of the feed screw, the reciprocating slides 62 deliver the can covers, or ends, successively to the marker and then into the cover guideway directly above the incoming cans where they are then both taken up by the pushers 138 of the upper set of conveyer chains and are advanced together to the alining arms and thence along the assembling guides whereby the covers are gradually applied within the mouths of their respective cans. Thence the cans pass the clinching devices which engage the flanges of the covers at opposite sides to clinch them over the can body flanges prior to delivery of the cans into the double seamer.

On entering the double seamer the cans are successively taken up by the pushers on the intermittent conveyer chain 210 and are forwarded by these intermittent movements successively, to the first operation spindle, thence to an idle station, thence to the second operation spindle. As they reach the first operation spindle station they are lifted upwardly by pad 217 into proper relation for seaming. The seaming rolls of this spindle are then actuated inwardly against the seam and the first operation is completed as previously described. The second advance movement of the can from the first spindle places it in position for the second operation, and it is then lifted by its pad 217' into seaming position, and the seaming rolls of the second spindle are then actuated inwardly against the seam to complete it. The next advance movement of the can delivers it from the machine.

The principal features embodied in this machine which render it capable of satisfactory high speed operation without waste, reside in the straight line delivery of cans and covers into the machine, the gradual and easy application of the covers to the cans, and the clinching of the covers to the cans prior to delivery into the double seamer. Also in the details of construction of the seamer mechanism partly with reference to the seamer spindles, each of which employs four seaming rolls instead of the customary two, and in the provision of the roll controlling cams of novel construction and the use of the roll mounting and actuating levers which by reason of a definite proportioning in lengths avoids the necessity or use of abrupt cams for actuating the rolls, and thus insures an easy operation, free of undesirable strain or vibration.

Having thus described our invention, what we claim as new therein and desire to secure by Letters-Patent is—

1. In a can closing machine, a can guideway, a cover guideway, and mechanism operable for a positive movement of open end cans and covers therefor in registration along their respective guideways; said cover guideway being inclined gradually for an extended distance toward the can guideway whereby, incident to their advancement, the covers will be seated within the cans first at their forward edges and finally at their rearward edges.

2. In a can closing machine, a can guideway, a cover guideway, conveyer mechanism operable for a positive movement of cans and covers therefor along their respective guideways in relation for their assembling; said cover guideway for an extended distance being inclined toward and finally merging into the can guideway to effect a gradual seating of the covers within the cans as they advance.

3. In a can closing machine, an upper guideway, a lower guideway, means for delivering cans open at their upper ends, in succession to the lower guideway, means synchronized therewith for delivering can covers into the upper guideway, and conveyer mechanism operable for a positive movement of cans and covers therefor in relation for assembling, along their respective guideways; said upper guideway being inclined for an extended distance toward and finally merging into the lower guideway whereby, incident to advancement of the cans and covers, the latter are caused to be pressed into the cans first at their forward edges and finally at their rearward edges.

4. In a can closing machine, a seamer, a guideway along which cans open at their ends may be advanced for delivery to the seamer, a second guideway within which covers may be advanced for application to the cans, and a conveyer belt operating along said guideways and having means therein arranged for the advancement in relation for assembling of a can and a cover therefor, said guideways being inclined toward each other for an extended distance and finally merging, whereby incident to the synchronized advancement of the cans and covers therealong, the latter will be seated within the cans first at their forward edges and finally at their rearward edges.

5. In a can closing machine, in combination, guideways into which open end cans and covers therefor, respectively, may be delivered, means whereby cans and covers delivered into their respective guideways may be moved therealong, one of said guideways, for an extended distance, being directed toward the other and finally merged therewith to cause the can covers, while moving, to be brought against and pressed into the cans first at their forward edges and finally at their rearward edges and to be held seated during farther advancement along the merged guideways, and a clinching mechanism operable on the can covers to clinch them to the cans while thus seated.

6. In a can closing machine, in combination, a seamer, a guideway along which flanged end cans will be guided in their delivery to the seamer, another guideway by which flanged covers for the cans will be guided for application to the cans, conveyer mechanism whereby cans and covers delivered into their respective guideways will be synchronously advanced, said guideways for an extended distance being inclined one toward the other and finally merging, thereby to cause the cans and covers to be assembled while passing along this distance, and whereby the forward edges of the covers will be caused to seat, within the open ends of the cans first at their forward edges and finally at their rearward edges and means for clinching the can and cover flanges together.

7. In a can closing machine, in combination, a seamer, a guideway within which open end can bodies may be advanced in their delivery to the seamer, a guideway overlying the can guideway in which covers may be advanced for application to the cans, a conveyer belt with means thereon for advancing cans and covers therefor in registration along their respective guideways to the seamer; said cover guideway being gradually inclined toward and finally merging into the can guideway to cause the covers to be applied, by reason of their advancement, to the open ends of the cans and to be held by the guideway against displacement, and means for acting on opposite edges of the covers after they have been thus applied to effect holding connections with the can bodies.

8. In a closing machine for oval cans, in combination, a guideway along which open end cans may be moved, another guideway in which can covers may be advanced in relation for application to the cans, means for moving the cans and covers along their respective guideways; said cover guideway being inclined toward and finally merging into the can guideway whereby the covers, by reason of their advancement, are caused to move toward and to be applied to the cans, and movable devices at opposite sides of the guideways and means for positively and definitely actuating said devices in contact with said cans and their covers to adjust them into registering alinement as the cover is seated.

9. In a closing machine for oval cans, a guideway along which open end cans may be moved, a guideway spaced above the can guideway along which covers may be moved for application to the cans, means whereby the cans and covers therefor may be advanced along their respective guideways, said cover guideway being gradually inclined toward and finally merging into the can guideway whereby the covers, by reason of their advancement, are caused to move toward and to be seated within the can ends, means at opposite sides of the guideways for engaging with the cans and covers as they are advanced to adjust them into registering alinement as the covers are applied, and means operable to indent the covers for effecting a clinched holding connection between the covers and cans after they have been thus assembled.

10. In a closing machine for oval cans, a guideway along which open end cans may be moved, a guideway along which covers may be moved for application to the cans, means whereby the cans and covers may be advanced along their respective guideways in relation for being assembled; said cover guideway being gradually inclined toward and finally merging into the can guideway whereby the covers, by reason of their advancement, will be applied to the cans, first at their forward edges, then at their rearward edges, a pair of arms swingingly mounted at opposite sides of the guideways and means operating in synchronism with the advance movement of the cans and covers, for effecting a positively controlled inward and outward swinging of the arms to engage with the opposite side edges of the cans and their corresponding covers without pressure to adjust them in registering alinement for seating the covers.

11. In a can closing machine, a guideway within which open end oval cans may be successively advanced lengthwise, a guideway spaced above the can guideway within which covers for the cans may be advanced lengthwise, a conveyer belt operable along the guideways with means thereon to advance the cans and covers together along their respective guideways; said guideways merging one into the other whereby, incident to advancement, the covers are caused to move toward and to be seated in the cans, first at their forward ends, then at their rearward ends, a pair of arms swingingly mounted at opposite sides of the guideways and means operating in synchronism with the advance movement of the cans and covers whereby said arms are caused to engage with the forward ends of the cans and their corresponding covers to bring these ends into registering alinement, then to follow along the opposite side edges to the rear ends of the cans and covers as they advance to retain the alinement while the cans advance and the covers are seated.

12. In a closing machine for oval cans, a guideway within which open end cans may be advanced lengthwise, a guideway spaced above the can guideway within which covers for the cans may be advanced lengthwise, a conveyer belt operable along the guideways having pushers at spaced intervals thereon each for engaging the rear end of a can and its corresponding cover, to advance them together along their respective guideways; said guideways gradually merging one into the other and whereby, incident to advancement, the covers are caused to move toward and to be seated in the cans first at their forward ends, then at their rearward ends, then to be held seated during advancement, a pair of arms swingingly mounted at opposite sides of the guideway and means operating in synchronism with advance movement of the cans and covers whereby said arms are caused to engage with the forward end of each can and its cover to bring them into registering alinement, then to follow along the opposite side edges thereof to the rear end of the can and cover as they advance to retain the alinement while the cover is seated in the can, and means engageable with the opposite side edges of the covers after they have been applied to the cans for effecting a clinched connection with the can bodies in limited regions.

13. In a machine of the character described, a guideway and means for pushing flanged end cans, with flanged covers seated therein, along the guideway, a pair of clinching rolls arranged at opposite sides of the guideway, means for actuating the rolls simultaneously into and from momentary contact with the cover flanges at opposite sides of the cans as the cans pass along the guideway, and means for rotating the rolls in the direction of movement of the cans.

14. In a machine of the character described, a guideway, means for pushing flanged end cans, with flanged covers applied thereto, in succession along the guideway, a pair of shafts, arms fixed to the shafts and extending along the guideway, clinching rolls mounted by said arms, means for oscillating the shafts in synchronism with advancement of the cans to cause said arms to be swung inwardly and outwardly and said rolls to simultaneously and momentarily engage with opposite side edges of the covers to clinch them to the cans, along limited regions, and means for rotating said rolls in the direction of movement of the cans.

15. In a closing machine for oval cans, a guideway along which open end cans may be advanced, a second guideway within which covers for the cans may be advanced lengthwise, a conveyer belt operable along the guideways having pushers at intervals thereon for advancing the cans and covers together along their respective guideways; said guideways being brought together to effect a gradual seating of the covers in the can ends incident to advancement along the guideways, means movable against the cans and their covers to retain them in alinement for seating the covers, clinching devices at opposite sides of the guideway and means for actuating them momentarily into the guideway against the opposite edges of the covers to clinch them to the cans.

16. A machine as in claim 15 wherein the clinching devices consist of rolls mounted by supporting arms to swing from and against opposite edges of the can covers, and wherein means is provided to actuate said arms, and to rotate the clinching rolls in the direction of movement of the covers along their engaging edges.

17. In a can closing machine, a guideway for the endwise advancement of cans, means for delivering open end oval cans successively and in regular order into the guideway, a second guideway directly above and gradually inclined toward and finally merging into the first mentioned guideway, means synchronized with the can delivery means for delivery of can covers into the second guideway for endwise movement therealong, a conveyer belt operating along the guideways and having pushers thereon at regular intervals whereby the cans and their corresponding covers are advanced, and whereby the covers are caused by reason of merging of the guideways and advancement of cans and covers therealong to be moved toward and applied to the cans, means adjacent the opposite sides of the guideways for engaging the cans and their covers to bring them into registering alinement for assembly, means adjacent the guideways against which the covers are advanced after application to the cans to effect a clinched connection with the cans, and a seamer for receiving the cans from the guideway and for seaming the covers thereto.

18. In a machine of the character described, a straight and continuous guideway, means for delivering open end cans successively into the guideway for travel therealong, a second guideway directly above and coextensive with the first guideway and having a portion of substantial length gradually inclined toward and finally merging with the first guideway, means for delivering covers for the cans into the second guideway for endwise travel in accordance with the delivery of cans, and a conveyer mechanism operating along the guideways to advance the cans and covers therefor in registration along their respective guideways whereby the covers, incident to travel, are caused to gradually approach and finally to seat within the cans first at their forward ends, then at their rearward ends, and whereby the covers during movement through the outlet end of the guideway are held seated and clinching devices operable in opposed relation against the seated covers to clinch them to the cans at opposite sides.

19. In a machine of the character described, a straight and continuous guideway, means for delivering open end oval cans successively and in regular order into the receiving end of the guideway, a second guideway directly overlying and having its receiving end portion parallel with the first guideway, then having an intermediate portion gradually directed toward and finally merging into the lower guideway and thence continuing with the lower guideway to its outlet end, means for delivering can covers into the receiving end of the upper guideway in accordance with the delivery of cans, a conveyer belt operating along the guideways, and having pushers at regular intervals thereon for advancing the cans and covers in registration along the guideways and whereby the covers, incident to travel along the inclined portion of the guideway, are caused to be applied to the cans, means adjacent the guideways whereby the covers are held in registering alinement with the cans while applied thereto, clinching devices for operating on the covers after they have been applied to retain them on the cans, and a seamer mechanism including means for receiving the cans as delivered from the guideway and for carrying them through the seam forming mechanism.

20. A machine as set forth in claim 19 wherein the can covers are delivered successively from a storage hopper to the guideway by a plurality of intermittent advance movements and by means synchronized with the movement of the conveyer belt, and wherein means is provided for applying a mark of identification to each cover while at rest between the hopper and its guideway.

21. In a can closing machine of the character described, a guideway into which open end cans may be delivered in succession, a guideway into which can covers may be delivered in accordance with the delivery of cans, a conveyer mechanism for advancing the cans and covers therefor together along their respective guideways; said cover guideway closely overlying the can guideway and finally merging therewith to cause the covers to be gradually applied to the cans progressively from one edge to the opposite edge, incident to and as they are advanced, and a seamer arranged to receive the covered cans from the guideway and comprising first and second operation seaming spindles, and an intermittently moving conveyer for taking up and advancing the cans from said guideway in succession to said spindles for completing the closing operation.

22. In a can closing machine of the character described, a guideway into which open end cans may be delivered in succession, a guideway into which can covers may be delivered in accordance with the delivery of cans, a conveyer mechanism operating along the guideways for advancing the cans and covers therefor in registration; said cover guideway being inclined gradually toward and merging with the can guideway to cause said covers to be moved toward and applied to the can ends, means adjacent the guideway to hold the cans and their covers in registering alinement as the covers are applied, clinching rolls at opposite sides of the guideway, means for causing said rolls to engage with the can covers at opposite side edges to clinch them to the bodies along limited regions prior to delivery from the guideway, and a double seamer mechanism arranged to receive the covered cans from the guideway and comprising first and second seaming spindles, a conveyer mechanism for taking up the cans as delivered from the guideway, and a driving means for the conveyer synchronized in its movement with the can and cover conveyer and operable by intermittent movements to advance the cans in succession to the spindles for completing the closing operation.

23. A closing machine for oval cans comprising a straight guideway along which open end cans may be advanced endwise, a timing means whereby the cans are delivered successively in regular order into the guideway, a second guideway spaced above that first mentioned in which can covers may be advanced endwise, a hopper adjacent the guideway for storage of can covers, a cover marker between the hopper and guideway, means synchronized with the can timing means for feeding covers to the marker and then into the upper guideway in accordance with the delivery of cans, a conveyer belt operating along the guideways having pushers thereon each for engaging a can and cover to advance them togethe along their respective guideways; said upper guideway gradually inclining into the lower one to cause the covers to be moved toward and applied to the cans incident to their advancement, means for holding the covers in registration with the cans while moving thereinto, devices for momentarily engaging the covers at opposite sides to clinch them along limited regions to the cans, and a double seamer for receiving the covered cans from the guideway and comprising first and second seaming spindles, a conveyer, pushers on the conveyer arranged to take up the cans as delivered from the guideway, and means for intermittently advancing the cans to the seaming spindles for closing the seam.

24. The combination with an assembling means for cans and covers therefor, of a seamer mechanism including spaced apart first and second operation seaming spindles, a can supporting pad alined with each spindle, a can guideway across the pads arranged to receive the cans in succession from the assembling means, an intermittently moving conveyer belt operable along the guideway having means thereon for the advancing of the cans in succession to the pads and means synchronized with movement of the conveyer for lifting the pads to raise the cans from the guideway to the spindles for seaming; said spindles having seaming rolls and means for actuating them against the cans for seaming.

25. A seamer for oval cans comprising a seaming head, means for supporting a can coaxially thereof for seaming, said head and means having relative rotation, a cam axially alined with the head and non-rotative relative to the can supporting means, a seaming lever pivotally mounted in the head, a seaming roll on the lever, a cam follower associated with the lever and engaging the cam and means for axially shifting the cam; said cam being axially tapered whereby an axial shifting will adjust the lever to press the seaming roll against the can to form the seam and having a contour developed from the can shape whereby said lever will be actuated to cause said seaming roll to follow the contour of the can while in or out of seam forming contact therewith.

26. A seamer for oval cans comprising a seaming head, means for supporting a can coaxially thereof for seaming; said head and means having relative rotation, a cam axially alined with the head and non-rotative relative to the can supporting means, a seaming lever pivotally mounted in the head to swing in a plane that is perpendicular relative to the axis of the seaming head, a seaming roll at one end of the lever, a cam follower associated with the lever and engaging the cam and means for axially shifting the cam; said cam being axially tapered whereby an axial shifting thereof will adjust the lever to press the seaming roll against the can to form the seam and having a contour developed with regard to the oval shape of the can and length of the lever arms to cause said seaming roll to follow the contour of the can while in or out of seam forming contact therewith.

27. A double seamer for oval cans comprising an axially revoluble head, a non-rotating chuck for seating the end of a can to be seamed, a tapered cam axially alined with the head, a plurality of seaming levers pivotally mounted in the head, seaming rolls mounted by said levers, a cam follower associated with each of said levers and engaging the cam during rotation of the head, and means for adjusting the cam axially for causing said levers to be actuated to press the rolls into contact with the can for a seam forming operation; said cam having its contour developed to cause said levers to be pivotally actuated during the seam forming operation to cause said rolls to follow the contour of the can.

28. A double seamer for oval cans comprising an axially revoluble head, a non-rotating chuck co-axially thereof for seating the end of a can to be seamed, a non-rotating cam co-axial of the head, means for shifting the cam in its axial direction, a plurality of seaming levers pivotally mounted in the head to swing in a plane perpendicular to the axis of the head, a seaming roll at one end of each lever, a cam following roller mounted at the other end of each lever and springs acting against the levers to maintain the followers in contact with the cam as the head rotates; said cam having a contour developed with regard to oval shape of the can and length of arms of said levers, to cause said seaming rolls to follow the contour of the can, and being tapered axially whereby axial adjustment in opposite directions will cause said rolls to be adjusted against and from the can in a seaming operation.

29. A seamer mechanism, comprising a can support, a spindle shaft, a spindle head revoluble on the shaft, pivot shafts mounted in the head, arms fixed to the pivot shafts, seaming rolls mounted by the arms for movement thereby into and from seaming contact with a can on said support, levers fixed to the said pivot shafts, cam rollers on said levers and a tapered cam slidably keyed on the spindle shaft and engaged by the said rollers, and shaped in a manner to cause the seaming rolls to be actuated, incident to rotation of the spindle head, inwardly and outwardly in accordance with the contour of the can, and adjustable lengthwise of the spindle shaft for moving the rolls against and for releasing them from seaming contact with the can, said roll mounting arms being substantially greater in length than their actuating levers, thereby permitting use of a cam of more even contour than that of the can.

30. A seamer mechanism comprising a can support, a spindle shaft alined therewith, a chuck fixed to the end of the shaft and against which a can may be lifted by its support for seaming, a spindle head revoluble on the shaft, pivot shafts mounted by the head, arms fixed to said pivot shaft, seaming rolls mounted by the arms for movement against the can for seaming, springs mounted in the head and bearing against the arms to urge them outwardly, levers fixed to the pivot shafts for actuating the arms, cam rollers on said levers, a tapered cam slidably keyed to the spindle shaft engaged by said rollers and shaped to actuate the levers, as the head revolves about the cam to move the rolls inwardly and outwardly in accordance with the contour of the can, a supporting sleeve for the cam, a lever arm fixed to the sleeve to actuate the cam axially to cause the seaming rolls to be moved inwardly against the can for seaming; said arms being of substantially greater length than the said levers to permit use of a tapered cam of more even contour than the can.

NELSON TROYER.
PAUL E. PEARSON.